United States Patent Office 3,591,655
Patented July 6, 1971

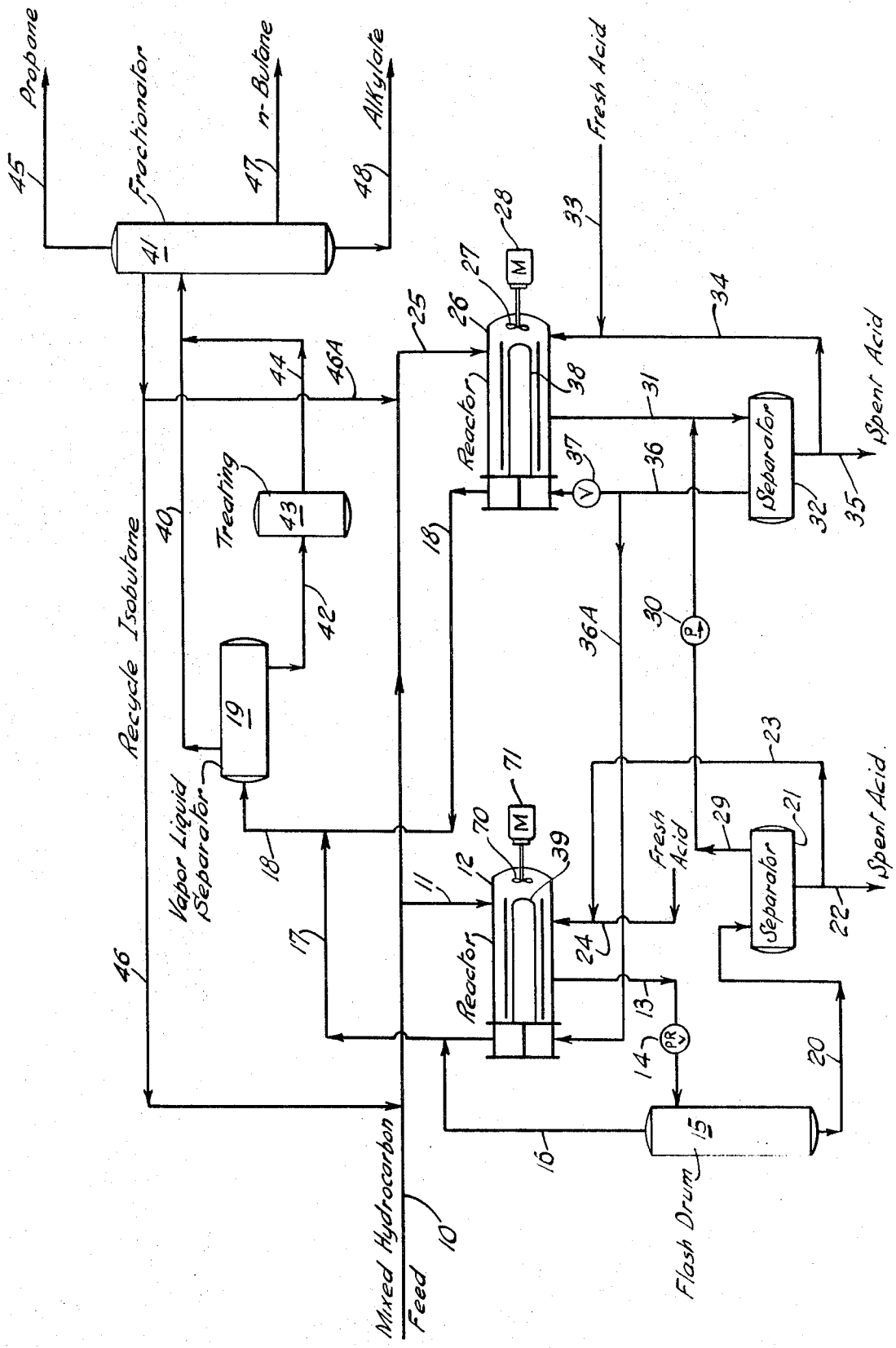

3,591,655
COMBINATION OF EMULSION FLASHING AND EFFLUENT REFRIGERATION IN SULFURIC ACID ALKYLATION
Ralph M. Lewis, Nederland, Tex., Henry D. Moorer, Richmond, Va., and James O. Francis, Houston, Tex., assignors to Texaco Inc., New York, N.Y.
Filed Dec. 16, 1968, Ser. No. 783,932
Int. Cl. C07c 3/54
U.S. Cl. 260—683.62
3 Claims

ABSTRACT OF THE DISCLOSURE

Process for obtaining improved refrigeration results in sulfuric acid alkylation utilizing two alkylation reactor: The emulsion of acid and hydrocarbon from one reactor is flashed and the resulting mixture is separated into a cold acid phase and a cold hydrocarbon phase. The acid phase is used to cool this reactor while the hydrocarbon phase is combined with the reaction mixture from the other reactor to provide temperature reduction. The reaction mixture of this reactor is separated into acid and hydrocarbon phases, the acid phase returned to said reactor and portions of the hydrocarbon phase is passed through the tube bundles in each reactor. Pressure reduction provides effluent cooling in one of the reactors.

BACKGROUND OF THE INVENTION

Field of the invention

This invention is directed to improvements in the refrigeration and operation of the alkylation of isobutane with aliphatic olefins using a sulfuric acid catalyst. The reaction is exothermic and some type of refrigeration must be used in order to obtain good alkylation results. One method is termed effluent refrigeration. In this method the alkylation reaction mixture or reactor effluent emulsion is passed to a settler in which the hydrocarbon phase is separated from the acid phase. The hydrocarbon phase, usually containing 50% or more of isobutane, is passed at a reduced pressure to a tube bundle or heat exchanger in contact with the alkylation reaction mixture. The heat of alkylation reaction causes vaporization of isobutane and resulting cooling. Another refrigeration method is termed emulsion flashing. In this method the entire alkylation emulsion of acid and hydrocarbon is passed to a flash drum at a low pressure. The flashing of the isobutane and any light hydrocarbons causes cooling of the liquid hydrocarbon phase and acid phase. The liquid hydrocarbon phase, consisting principally of isobutane and alkylate, is separated from the acid phase and may be passed into indirect heat exchange with the alkylation reaction mixture, and at least part of the separated acid returned to the alkylation reactor in direct heat exchange with the alkylation reaction mixture.

The present invention involves a novel combination of effluent refrigeration and emulsion flashing.

SUMMARY OF THE INVENTION

Alkylation reactor emulsion of acid and hydrocarbon at essentially alkylation temperature and pressure from an alkylation reactor cooled by effluent refrigeration is mixed with the cold liquid hydrocarbon effluent after flashing of the emulsion from an alkylation reactor cooled by emulsion flashing. A cold liquid hydrocarbon effluent is separated from the mixture and a portion of this hydrocarbon effluent is passed into indirect heat exchange with either the contents of the first effluent refrigerated reactor or the contents of the second reactor cooled by emulsion flashing, or both.

The obvious way to operate an effluent refrigerated and an emulsion flashing reactor is to operate them either in parallel or independently. However, we choose to operate them cooperatively in combination in the manner of our invention. In this manner less heat exchanger capacity is required to maintain a given alkylation temperature. Alternatively, if the same amount of heat exchanger surface is used as if the reactors were operated independently, a lower alkylation temperature may be obtained. Or if the same alkylation temperature is maintained, the period of time may be increased before cleaning of heat exchangers is required.

Our invention is suitably adapted for use in a new installation. It is of most interest, however, as a means of economically expanding an existing alkylation unit of the effluent refrigeration type. One or more reactors equipped for emulsion flashing may be added, and operated in combination with an existing effluent refrigeration reactor in a manner as will be explained in detail later herein. Or if desired, a single reactor could be used, with part of the alkylation reaction mixture being processed by effluent refrigeration and part by emulsion flashing.

BRIEF DESCRIPTION OF DRAWINGS

Having set forth its general nature, the invention will be best understood from the more detailed description hereinafter which refers to the accompanying drawing. Although the drawing illustrates one arrangement of apparatus in which the process of this invention may be practiced, it is not intended to limit the invention to the particular apparatus or materials described.

The drawing shows an alkylation reactor refrigerated by effluent refrigeration and one refrigerated by emulsion flashing, and the two reactors operated in combination in accordance with our invention.

DESCRIPTION OF A PREFERRED EMBODIMENT

Referring to the drawing, a mixed hydrocarbon feed containing propylene and butylene with an excess of isobutane is passed through lines 10 and 11 into a first alkylation reactor 12 where alkylation of isobutane with propylene and butylenes takes place in the presence of sulfuric acid catalyst. Reactor 12 is under sufficient pressure to keep the reactants in the liquid phase. The reaction mixture in reactor 12 is mixed by impeller 70 driven by motor 71. Emulsion of hydrocarbon and acid is passed from reactor 12 through line 13 and pressure reduction valve 14 into flash drum 15. Vapor comprising mainly propane and isobutane is taken off overhead from flash drum 15 through lines 16, 17 and 18 into vapor-liquid separator 19. Liquid hydrocarbon and acid are taken off the bottom of flash drum 15 through line 20 into separator 21. A small amount of spent acid from separator 21 is discarded through line 22, and the major portion of the acid is recycled to alkylation reactor 12 through lines 22, 23 and 24. Fresh acid is charged to alkylation reactor 12 through line 24.

Mixed hydrocarbon feed containing propylene and butylene with an excess of isobutane is also charged through lines 10 and 25 into a second alkylation reactor 26, and fresh acid through lines 33 and 34. The reactor is under sufficient pressure to keep the reactants in the liquid phase. The reaction mixture in reactor 26 is mixed by impeller 27 driven by motor 28. Liquid hydrocarbon from separator 21 is passed through line 29 by pump 30 into line 31 where it joins emulsion of hydrocarbon and acid from alkylation reactor 26 through line 31, and the combined mixture is passed on into separator 32 through line 31 at reactor 26 pressure. Spent acid is discharged through line 35 from separator 32, and acid is recycled to reactor 26, through line 35 and 34.

Liquid hydrocarbon from separator 32 is passed through line 36 and pressure reduction valve 37 into tube bundle 38 in alkylation reactor 26 and then through line 18 into vapor-liquid separator 19. A part of the liquid hydrocarbon from separator 32 is also passed through lines 36 and 36A into tube bundle 39 in alkylation reactor 12 and thence to vapor-liquid separator 19 through lines 17 and 18.

The vapor from vapor-liquid separator 19 is condensed and cooled by means not shown and passed through line 40 into fractionator 41 and processed by conventional means. The vapor from vapor-liquid separator 19 contains propane, which should be eliminated from the alkylation system, and isobutane which should be recovered for alkylation.

Liquid hydrocarbon from vapor-liquid separator 19 containing alkylate from alkylation reactors 12 and 26 is passed through line 42 to conventional treating 43, and thence through lines 44 and 40 into conventional fractionation shown schematically as fractionator 41. Propane is taken off the top of fractionator 41 through line 45. Isobutane is taken off as a side stream near the top of fractionator 41 through lines 46 and 46A for recycle to alkylation reactors 12 and 26 via hydrocarbon feed line 10, and lines 11 and 25, respectively. n-Butane is taken off as a side stream through line 47 and the desired product of alkylate is taken off as the bottoms from fractionator 41 through line 48.

ALKYLATION

The conditions for the alkylation step in both reactors are those which are well known in the art, such as, good mixing, a temperature of about 40° F., reactants in the liquid phase, a high concentration of isobutane in the hydrocarbon portion of the reaction mixture, about a 50–50 mixture by volume of acid and hydrocarbon, a space velocity of about 0.5 or lower, and fresh makeup acid of about 99.0 to 99.5% sulfuric acid.

EXAMPLE

A hydrocarbon feed stock including the isobutane recycle has the following composition:

| | Volume percent |
|---|---|
| Propane | 2.9 |
| Propylene | 2.9 |
| Isobutane | 76.3 |
| Isobutylene | 1.8 |
| Butylene-1 | 0.8 |
| Butylene-2 | 1.3 |
| n-Butane | 12.7 |
| Isopentane | 1.3 |
| | 100.0 |

The above hydrocarbon feed in the amount of 434 barrels per hour at 35° F. is charged to a first alkylation reactor 12 having emulsion flashing facilities. Reactor 12 is maintained at 40° F. and 100 p.s.i.a. 2153 pounds per hour of 99% $H_2SO_4$ and 1149 barrels per hour of recycle acid from the alkylation settler are also charged to alkylation reactor 12. Reactor emulsion comprising hydrocarbon and acid at 40° F. at a rate of 1567 b.p.h. is passed from reactor 12 to flash drum 15 which is maintained at a pressure of 15 p.s.i.a. Light components of the emulsion are flash vaporized in flash drum 15, thereby cooling the remaining liquid bottoms. Vapor at the rate of 143 b.p.h. (liquid) is taken overhead at 15 p.s.i.a. and 19° F. and passed through lines 16, 17 and 18 to a vapor-liquid separator 19 and subsequent conventional processing. Bottoms comprising acid and hydrocarbon from flash drum 15 in the amount of 1424 b.p.h. at 19° F. and 15 p.s.i.a. are pumped at 100 p.s.i.a. to separator 21 in which the acid and hydrocarbon are separated by gravity settling. Acid from the bottom of separator 21 at 20° F. in the amount of 1149 b.p.h. is charged to alkylation reactor 12. Cold hydrocarbon at 20° F. is withdrawn from the top portion of separator 21 through line 29 and after passing through pump 30 in the amount of 275 b.p.h. is admixed in line 31 with 1566 b.p.h. of emulsion effluent from a second alkylation reactor 26 giving a mixture at a temperature of 37.5° F. The mixture is passed through line 31 to second settler 32.

Another portion of the above hydrocarbon feed in the amount of 434 barrels per hour at 35° F. is charged to a second alkylation reactor 26 cooled by effluent refrigeration. Second reactor 26 also is maintained at 40° F. and 100 p.s.i.a. 2153 pounds per hour of 99% $H_2SO_4$ and 1149 barrels per hour of recycle acid from the alkylation settler are charged to the reactor. 1566 barrels per hour of reactor emulsion at 40° F. from alkylation reactor 26 are passed through line 31 to separator 32 at 100 p.s.i.a. after being mixed in line 31 with 275 barrels per hour of hydrocarbon at 20° F. from the first alkylation reactor via line 29. Liquid hydrocarbon at 37.5° F. is passed from separator 32 at the rate of 422 barrels per hour to exchanger tube bundle 38 in reactor 26, and at a rate of 270 barrels per hour to tube bundle 39 in reactor 12. Acid from separator 32 at 37.5° F. at the rate of 1148 barrels per hour is returned to alkylation reactor 26 via line 34.

Hydrocarbon effluent of liquid and vapor from tube bundles 39 and 38 in reactors 21 and 26, and vapor from flash drum 15 are passed to vapor-liquid separator 19 at a combined rate of 835 barrels per hour. The vapor from vapor-liquid separator 19 at the rate of 336 barrels per hour is processed by conventional means for removal of propane and recovery of isobutane for recycle to the alkylation reactors. The liquid from vapor-liquid separator 19 at the rate of 500 b.p.h., is subjected to conventional treating in treating vessel 43, as by caustic and water washing, and then charged to conventional fractionation. The combined production of alkylate from both alkylation reactors is 2460 barrels per operating day.

The acid consumption of 99.0% $H_2SO_4$ for the production of 2460 barrels of alkylate per operating day under the conditions described in 0.50 pound per gallon of alkylate. The research octane clear of the alkylate is 94.5 and with the addition of 3.0 cc. of tetraethyl lead per gallon of alkylate the research octane number is 107.4. The motor octane clear is 92.0 and with 3 cc. of TEL is 106.8.

The discussion hereinafter will serve to bring out more clearly the advantages of our invention. Reactor emulsion from reactor 26 is reduced in temperature from 40° F. to 37.5° F. by direct heat exchange, physical mixing, in line 31 with 20° F. liquid hydrocarbon phase from separator 21, which hydrocarbon phase had been reduced in temperature from the reactor temperature of 40° F. by emulsion flashing. Therefore, recycle acid in line 34 and the hydrocarbon phase in line 36, both of which are derived from separator 32, are also at a temperature of 37° F. The net result of passing the 37.5° F. hydrocarbon in line 36 in indirect heat exchange and the 37.5° F. acid in line 34 in direct heat exchange to alkylation reactor 26 is to enable the required cooling surface in the heat exchanger to be reduced by 26.8% or from 3801 square feet to 2784 square feet as compared with the surface area which would be required if both reactors were operated completely independently in parallel without the flow of our invention. If it is desired to employ the same amount of cooling surface as required without our invention, then the effluent refrigerated reactor 26 could be operated at 38.7° F. rather than 40.0° F. This would lower the reactor temperature resulting in lower acid consumption.

The above figures are for the particular conditions and examples given. Alternatively, some of the acid from separator 21 can be passed to reactor 26 instead of sending all of it to reactor 12. Also, some of the acid from separator 32 can be passed to reactor 12. For example, if the olefin feed to reactor 12 contains over about 60% propylene (40% butylenes), and the olefin feed to reactor 26 contains at least 60% butylenes, it is advantageous not to discard any spent acid from separator 21 but rather to send it to reactor 26, and discard acid corresponding to that from both reactors from separator 32.

Obviously, many modifications and variations of the invention as hereinabove set forth, may be made without departing from the spirit and scope thereof, and therefore, only such limitations should be imposed as are indicated in the appended claims.

I claim:
1. In a process for the alkylation of an isoparaffin with an olefin in the presence of a sulfuric acid catalyst wherein a liquid reaction mixture is maintained under alkylation conditions in alkylation zones comprising at least two alkylation reactors, the improvement which comprises:
   (a) withdrawing from a first alkylation reactor a first reaction mixture,
   (b) passing said first reaction mixture to a flash vaporization zone effecting separation of said stream into hydrocarbon vapor and a residual liquid mixture of hydrocarbin and acid, with concomitant cooling of said hydrocarbon vapor and said liquid mixture,
   (c) separating said cooled residual liquid mixture into a first liquid effluent hydrocarbon phase and a cooled first acid phase,
   (d) withdrawing from a second alkylation reactor a second reaction mixture,
   (e) combining said second reaction mixture with said cooled first liquid effluent hydrocarbon phase resulting in a composite liquid mixture of hydrocarbon and acid,
   (f) separating said composite liquid mixture of hydrocarbon and acid into a second effluent hydrocarbon phase and a second acid phase,
   (g) returning said coooled first acid phase to said first alkylation reactor and said second acid phase to said second alkylation reactor in direct admixture with said first and second reaction mixtures in said first and second reactors,
   (h) passing a portion of said second effluent hydrocarbon phase in indirect heat exchange with said first reaction mixture in said first alkylation reactor, and
   (i) passing the remaining portion of said second effluent hydrocarbon phase through a pressure-reducing zone and then in indirect heat exchange with said second reaction mixture in said second alkylation reactor.

2. Process of claim 1 in which said isoparaffin is isobutane.

3. Process of claim 1 in which said olefin is selected from the group of propylene, butylenes and amylenes.

References Cited
UNITED STATES PATENTS

| | | | |
|---|---|---|---|
| 3,000,991 | 9/1961 | Goldsby et al. | 260—683.46 |
| 3,007,983 | 11/1961 | Clauson | 260—683.61 |
| 3,121,126 | 2/1964 | Goldsby et al. | 260—683.62 |
| 3,256,360 | 6/1966 | Goldsby et al. | 260—683.62 |

DELBERT E. GANTZ, Primary Examiner

G. J. CRASANAKIS, Assistant Examiner